US012802566B2

(12) United States Patent
Kim

(10) Patent No.: US 12,802,566 B2
(45) Date of Patent: Nov. 17, 2026

(54) SYSTEM AND METHOD FOR CONTROLLING VEHICLE

(71) Applicants: HYUNDAI MOTOR COMPANY, Seoul (KR); KIA CORPORATION, Seoul (KR)

(72) Inventor: Tae Heon Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 12 days.

(21) Appl. No.: 18/934,594

(22) Filed: Nov. 1, 2024

(65) Prior Publication Data

US 2025/0218292 A1 Jul. 3, 2025

(30) Foreign Application Priority Data

Dec. 27, 2023 (KR) ........................ 10-2023-0193509

(51) Int. Cl.

*G08G 1/0967* (2006.01)
*G08G 1/01* (2006.01)
*G08G 1/017* (2006.01)
*G08G 1/052* (2006.01)

(52) U.S. Cl.

CPC ..... *G08G 1/096775* (2013.01); *G08G 1/0133* (2013.01); *G08G 1/017* (2013.01); *G08G 1/052* (2013.01)

(58) Field of Classification Search

CPC ..... H04W 4/023; H04W 4/024; H04W 4/029; G08G 1/20; G08G 1/096741; G08G 1/166; G08G 1/0145; G08G 1/167; G08G 1/052

See application file for complete search history.

(56) References Cited

U.S. PATENT DOCUMENTS

2018/0239359 A1* 8/2018 Jian .................... B60W 60/0053
2021/0020037 A1* 1/2021 Awad Alla ............. G08G 1/017
2021/0118286 A1* 4/2021 Jiang ..................... H04W 4/023
2021/0179131 A1* 6/2021 Maeda .................. B60W 30/18

FOREIGN PATENT DOCUMENTS

KR 2019-0079334 A 7/2019

* cited by examiner

*Primary Examiner* — Erin M Piateski
*Assistant Examiner* — John C Merino
(74) *Attorney, Agent, or Firm* — MCDONNELL BOEHNEN HULBERT & BERGHOFF LLP

(57) ABSTRACT

A system for controlling a vehicle includes the vehicle acquiring information about driving, first information about a preceding vehicle, second information about a following vehicle, and third information about a surrounding vehicle and a server to acquire traffic information ahead of the vehicle, calculate a danger prediction result by inputting the traffic information, the first information, and the second information into a danger prediction model, determine an operation for coping with a danger based on at least one of the traffic information, the danger prediction result, the information about the driving, the first information, the second information, the third information, road information, or any combination thereof, and transmit information about the operation for coping with the danger to the vehicle.

19 Claims, 10 Drawing Sheets

SYSTEM AND METHOD FOR CONTROLLING VEHICLE

CROSS REFERENCE TO RELATED APPLICATIONS

This application claims the benefit of priority to Korean Patent Application No. 10-2023-0193509, filed in the Korean Intellectual Property Office on Dec. 27, 2023, the entire contents of which are incorporated herein by reference.

TECHNICAL FIELD

The present disclosure relates to a system and a method for controlling a vehicle, and more particularly, relates to a system and a method for controlling a vehicle, capable of avoiding a dangerous situation based on information about a preceding vehicle and information about a following vehicle.

BACKGROUND

In addition, there may be a preceding vehicle advancing ahead of a host vehicle and a following vehicle driving behind the host vehicle on a road. In general, the host vehicle runs while ensuring a safe following distance to the preceding vehicle, and even the following vehicle drives while ensuring a safe following distance to the host vehicle.

However, when the driver of the following vehicle is in a drowsy state or is driving without the safe following distance to the host vehicle, which is ensured, and when the host vehicle suddenly stops due to the sudden stop of the preceding vehicle, the preceding vehicle may collide with the host vehicle.

To prevent the crash accident, there has been suggested a technology of predicting the crash state based on the speed of the following vehicle and the distance of the following vehicle to the host vehicle, and ensuring the safe following distance depending on the presence of the preceding vehicle. However, this technology has a difficulty in avoiding the dangerous situation of the direct crash.

SUMMARY

The present disclosure has been made to solve the above-mentioned problems occurring in the prior art while advantages achieved by the prior art are maintained intact.

An aspect of the present disclosure provides a system and a method for providing a vehicle, capable of avoiding a crash danger of a following vehicle based on information about a preceding vehicle, information about the following vehicle, and information about a front traffic environment on a lane on which a host vehicle is driving, and information about a preceding vehicle on a surrounding lane, and information about a following vehicle on the surrounding lane.

Another aspect of the present disclosure provides a system and a method for providing a vehicle, capable of ensuring the safety by predicting the drowsy driving of a following vehicle or driving of the following vehicle without safe following distance ensured to avoid a crash danger.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling a vehicle, may include a vehicle to acquire information about driving, first information about a preceding vehicle, second information about a following vehicle, and third information about a surrounding vehicle, and a server to acquire traffic information ahead of the vehicle, calculate a danger prediction result by inputting the traffic information, the first information, and the second information into a danger prediction model, determine an operation for coping with a danger based on at least one of the traffic information, the danger prediction result, the information about the driving, the first information, the second information, the third information, road information, or a combination of the first information, the second information, the third information, and the road information, and transmit information about the operation for coping with the danger to the vehicle.

According to an embodiment, the vehicle may acquire information about a lane on which the vehicle is driving, and the information about the driving, which includes a speed of the vehicle, and transmits the acquired information to the server.

According to an embodiment, the vehicle may acquire the first information including a speed of the preceding vehicle, which drives ahead of the vehicle, on a lane the same as the lane on which the vehicle is driving, and a distance from the vehicle to the preceding vehicle.

According to an embodiment, the vehicle may acquire the second information including a speed of the preceding vehicle, which drives behind the vehicle, on a lane the same as the lane on which the vehicle is driving, and a distance from the vehicle to the following vehicle, a type of the following vehicle.

According to an embodiment, the vehicle may acquire the third information including a speed of the surrounding vehicle driving on a lane different from the lane on which the vehicle is driving, and a distance from the vehicle to the surrounding vehicle.

According to an embodiment, the server may determine whether the following vehicle is a commercial vehicle, based on the second information, and acquires a Digital tacho graph (DTG) data of the following vehicle, when the following vehicle is the commercial vehicle.

According to an embodiment, the server may determine a driving tendency of a driver, based on the DTG data of the following vehicle.

According to an embodiment, the server may calculate the danger prediction result by inputting the driving tendency of the driver into the danger prediction model, when the following vehicle is the commercial vehicle.

According to an embodiment, the server may calculate the danger prediction result including a first index indicating a probability of traffic jam ahead of the vehicle, a second index indicating a probability of sudden braking of the preceding vehicle, and a third index indicating a probability of dangerous driving of the following vehicle, based on the danger prediction model.

According to an embodiment, the server may acquire a traffic flow of the lane on which the vehicle is driving, information about presence of a shoulder road, and information about presence of a variable road.

According to an embodiment, the server may determine whether a condition allowing lane change is satisfied and determines the operation for coping with the danger, based on a determination result.

According to an embodiment, the server may determine an operation for turning on a turn light to perform the lane change as the operation for coping with the danger, when the vehicle is determined as satisfying the condition for allowing the lane change According to an embodiment, the server may determine an operation for allowing an emergency light to flicker and generating a horn sound as the operation for coping with the danger, when the vehicle is determined not as satisfying the condition allowing the lane change.

According to an embodiment, the server may determine an operation for outputting information about a lane recommended for the lane change and a message for guiding the lane change to the recommended lane, as the operation for coping with the danger, when the vehicle is determined not as satisfying the condition allowing the lane change According to an embodiment, the vehicle may control to receive the operation for coping with the danger from the server, and to perform the operation for coping with the danger.

According to another aspect of the present disclosure, a method for controlling a vehicle, may include acquiring information about driving of a vehicle, first information about a preceding vehicle, second information about a following vehicle, and third information about a surrounding vehicle, and transmitting the information, the first information, the second information, and the third information to a server, acquiring, by the server, traffic information ahead of the vehicle, and calculating a danger prediction result by inputting the traffic information, the first information, and the second information into a danger prediction model, determining, by the server, an operation for coping with a danger based on at least one of the traffic information, the danger prediction result, the information about the driving, the first information, the second information, the third information, road information, or a combination of the first information, the second information, the third information, and the road information, and transmitting, by the server, information about the operation for coping with the danger to the vehicle.

According to an embodiment, the method may further include calculating, by the server, the danger prediction result including a first index indicating a probability of traffic jam ahead of the vehicle, a second index indicating a probability of sudden braking of the preceding vehicle, and a third index indicating a probability of dangerous driving of the following vehicle, based on the danger prediction model.

According to an embodiment, the method may further include determining, by the server, whether a condition allowing lane change is satisfied and determines the operation for coping with the danger, based on a determination result.

According to an embodiment, the method may further include determining, by the server, an operation for turning on a turn light to perform the lane change as the operation for coping with the danger, when the vehicle is determined as satisfying the condition for allowing the lane change According to an embodiment, the method may further include controlling, by the vehicle, to receive the operation for coping with the danger from the server, and to perform the operation for coping with the danger.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
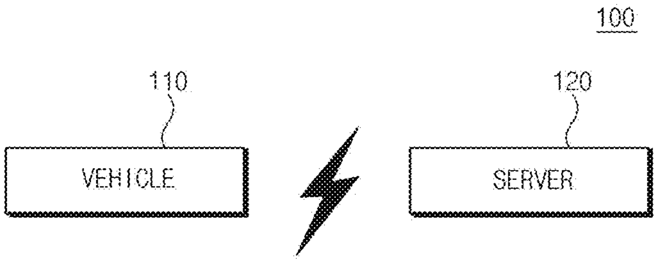
FIG. 1 is a view illustrating the configuration of a system for controlling a vehicle, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, “A”, “B”, “(a)”, “(b)”, and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of a system for controlling a vehicle, according to an embodiment of the present disclosure.

As illustrated in FIG. 1, a system 100 for controlling a vehicle may include a vehicle 110 and a server 120.

The vehicle 110 may acquire information about driving sensed when driving, first information about a preceding vehicle, second information about a following vehicle, and third information about a surrounding vehicle, and may transmit the acquired information to the server 120. The details of the vehicle 110 will be described later with reference to FIG. 2.

The server 120 may acquire traffic information ahead of the vehicle 110, generate a danger prediction model based on the traffic information, the first information, and the second information, calculate a danger prediction result by inputting the traffic information, the first information, and the second information into the danger prediction model, determine an operation for coping with a danger based on the danger prediction result, the information about the driving, the first information, the second information, the third information, and transmit information about the operation for coping with the danger to the vehicle 110. The details thereof will be described with reference to FIG. 3.

Figure 2:
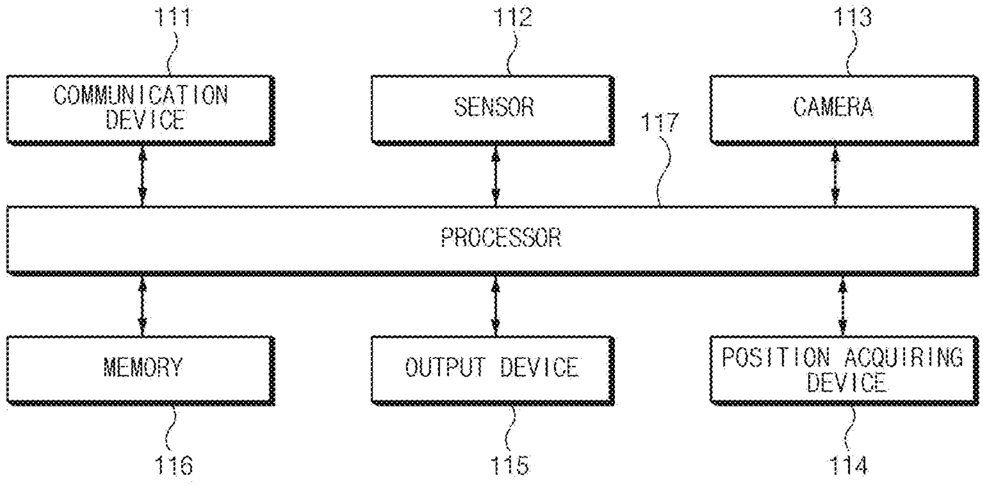
FIG. 2 is a view illustrating the configuration of a vehicle, according to an embodiment of the present disclosure.

FIG. 2 is a view illustrating the configuration of a vehicle, according to an embodiment of the present disclosure.

As illustrated in FIG. 2, the vehicle 110 may include a communication device 111, a sensor 112, a camera 113, a position acquiring device, an output device 115, a memory 116, and a processor 117.

The communication device 111 may make communication with the server 120. For example, the communication device 111 may make wireless communication with the server 120 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET). According to an embodiment, the communication device 111 may include a transceiver, a communication circuit, and a communication processor to transceive information using an antenna According to an embodiment, the communication device 111 may make vehicle to vehicle (V2V) communication or vehicle to something (V2X) communication.

The sensor 112 may acquire the first information about the preceding vehicle, the second information about the following vehicle, and the third information about the surrounding vehicle.

According to an embodiment, the preceding vehicle may include a vehicle driving ahead of the vehicle on a lane the same as a lane on which the vehicle 110 is driving. The first information may include the speed of the preceding vehicle, the position of the preceding vehicle, and the distance from the vehicle 110 to the preceding vehicle.

According to an embodiment, the following vehicle may include a vehicle driving behind the vehicle on a lane the same as a lane on which the vehicle 110 is driving. The second information may include the speed of the following vehicle, the position of the following vehicle, and the distance from the vehicle 110 to the following vehicle.

According to an embodiment, the surrounding vehicle may include a vehicle driving ahead of or behind the vehicle on a lane different a lane on which the vehicle 110 is driving. The third information may include the speed of the surrounding vehicle, the position of the surrounding vehicle, and the distance from the vehicle 110 to the surrounding vehicle.

According to an embodiment, the sensor 112 may acquire information about the driving of the vehicle 110. According to an embodiment, the information about the driving may include information about a lane on which the vehicle 110 is driving and the speed of the vehicle 110.

According to an embodiment, the sensor 112 may include at least one of a distance sensor including at least one of a radar or a light detection and ranging (LiDAR), an image sensor, a speed sensor, a heading sensor, a yaw sensor, a gyro sensor, a battery sensor, a steering wheel sensor, a temperature sensor, or any one combination thereof.

The camera 113 may be disposed at a front portion, a rear portion, a left side portion, and a right side portion of the vehicle 110 to acquire a surrounding image around the vehicle, which includes a front image, a rear image, a left image and a right image of the vehicle 110.

According to an embodiment, the camera 113 may acquire the position of the preceding vehicle, the position of the following vehicle, traffic information in front of the vehicle 110, and the type of the following vehicle, based on the surrounding image of the vehicle.

The position acquiring device 114 may be equipped with a global positioning system (GPS) receiver to acquire the information on the position of the vehicle, may perform the map-matching between the position of the vehicle and map data, which is previously stored, to provide a map image of a certain area based on the position of the vehicle, and may provide information about a path to the destination, when the destination is input by the user.

The output device 115 may output an image or a sound under the control of the processor 117. According to an embodiment, the output device 115 may be implemented using a display device or a sound output device. In this case, the display device may include a head up display (HUD) or cluster. According to an embodiment, the display device may be implemented with a display that employs a liquid crystal display (LCD) panel, a light emitting diode (LED) panel, an organic light emitting diode (OLED) panel, or a plasma display panel (PDP). The LCD may include a thin film transistor-LCD (TFT-LCD). The display device may be integrally implemented through a touch screen panel (TSP)

The memory 116 may store at least one algorithm to compute or execute various instructions for the operation of the vehicle according to an embodiment of the present disclosure. According to an embodiment, the memory 116 may store at least one instruction executed by the processor 117, and the instruction may allow the vehicle to operate according to an embodiment. The memory 116 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The processor 117 may be implemented by various processing devices, such as a microprocessor embedded therein with a semiconductor chip to operate or execute various instructions, and may control the vehicle according to an embodiment. The processor 117 may be electrically connected to the communication device 111, the sensor 112, the camera 113, the output device 115, and the memory 116 through a wired cable or various circuits to transmit an electrical signal including a control command to execute an arithmetic operation or data processing related to a control operation and/or communication. The processor 117 may include at least one of a central processing unit, an application processor, a communication processor (CP), or the combination thereof.

The processor 117 may transmit, to the server 120, the information acquired by the sensor 112 and the camera 113.

The processor 117 may control to perform an operation corresponding to the operation for coping with the danger, when receiving information about the operation for coping with the danger, from the server 120.

According to an embodiment, the processor 117 may control to turn on a turn light to correspond to the operation for coping with the danger, to output information about lane change through the output device 115, and to perform the lane change.

According to an embodiment, the processor 117 may control an emergency light to flicker corresponding to the operation for coping with the danger, to output a message for informing that a horn sound is generated, through the output device 115, and generate the horn sound.

Figure 3:
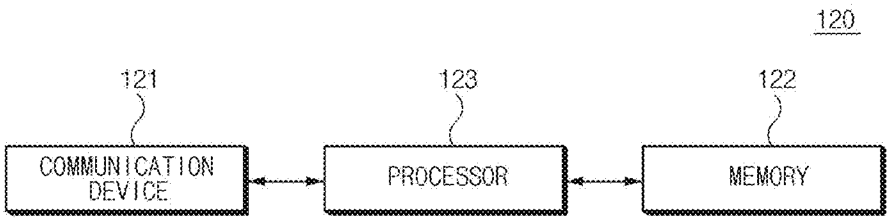
FIG. 3 is a view illustrating the configuration of a server, according to an embodiment of the present disclosure.

According to an embodiment, the processor 117 may control to output information about a lane recommended for the lane change and a message for guiding the lane change to the recommended lane through the output device 115, to correspond to the operation for coping with the danger, FIG. 3 is a view illustrating the configuration of a server, according to an embodiment of the present disclosure.

As illustrated in FIG. 3, the server 120 may include a communication device 121, a memory 122, and a processor 123.

In addition, the communication device 121 may make communication with the vehicle 110. For example, the communication device 121 may make wireless communication with the vehicle 110 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET). According to an embodiment, the communication device 121 may include a transceiver, a communication circuit, and a communication processor to transceive information using an antenna The memory 122 may store at least one algorithm to compute or execute various instructions for the operation of the vehicle according to an embodiment of the present disclosure. According to an embodiment, the memory 122 may store at least one instruction executed by the processor 123, and the instruction may allow the vehicle to operate according to an embodiment. The memory 122 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The processor 123 may be implemented by various processing devices, such as a microprocessor embedded therein with a semiconductor chip to operate or execute various instructions, and may control the operation of the server according to an embodiment. The processor 123 may be electrically connected to the communication device 121 and the memory 122 through a wired cable or various circuits to transmit an electrical signal including a control command to execute an arithmetic operation or data processing related to a control operation and/or communication. The processor 123 may include at least one of a central processing unit, an application processor, a communication processor (CP), or the combination thereof.

The processor 123 may acquire the traffic information ahead of the vehicle 110.

According to an embodiment, the processor 123 may receive information about a path to a destination from the vehicle 110. The processor 13 may receive traffic information included in the path to the destination from the vehicle 110, or from a traffic server to provide the traffic information.

According to an embodiment, the processor 123 may receive the first information about the preceding vehicle and the second information about the following vehicle, from the vehicle 110.

According to an embodiment, the processor 123 may receive, from the vehicle 110, the first information including the speed of a preceding vehicle driving ahead of the vehicle 110 on a lane the same as a lane on which the vehicle 110 is driving, the position of the preceding vehicle, and the distance from the vehicle 110 to the preceding vehicle.

According to an embodiment, the processor 123 may receive, from the vehicle 110, the second information including the speed of a following vehicle driving behind the vehicle 110 on a lane the same as a lane on which the vehicle 110 is driving, the position of the following vehicle, and the distance from the vehicle 110 to the following vehicle.

According to an embodiment, the processor 123 may determine the type of the following vehicle based on the second information. According to an embodiment, the processor 123 may determine whether the following vehicle is a commercial vehicle. In this case, the commercial vehicle is a commercial vehicle for commercial use, and may include a van including a bus for carrying a person, and a freight vehicle including a truck for loading goods.

When the processor 123 may receive data, which is measured through digital tacho graph (DTG) of the following vehicle, from a server (e.g., Korea Transportation Safety Authority) providing a driving record, when the following vehicle is the commercial vehicle. In this case, the DTG may store a vehicle driving record in real time while serving as a driving record device and transmit the vehicle driving record to a server that provides the driving record. For example, the data measured through the DTG may include a vehicle speed, an RPM, a brake signal, a vehicle position through GPS, an azimuth angle, an acceleration, a driving distance, a continuous driving time, a break time, and traffic accident information.

The processor 123 may receive the data measured through the DTG of the following vehicle and determine the driving tendency of the driver driving the following vehicle. According to an embodiment, the processor 123 may determine a driving tendency including sudden braking and drowsy driving resulting driving without ensuring the safe following distance by the following vehicle.

The processor 123 may calculate a danger prediction result by inputting the traffic information ahead, the first information, and the second information into a danger prediction model. According to an embodiment, the danger prediction model may be trained to output the danger prediction result based on learning data using an artificial neural network (ANN). According to an embodiment, the learning data may include the traffic information, the first information, and the second information which are previously acquired to generate the danger prediction model.

According to an embodiment, the processor 123 may input the driving tendency of the driver, which is determined based on the data measured through the DTG into the danger prediction model, together with the traffic information ahead of the vehicle 110, the first information, and the second information, when the following vehicle is the commercial vehicle. Accordingly, the processor 123 may calculate the danger prediction result based on the driving tendency of the driver driving the following vehicle, when determining the following vehicle as the commercial vehicle.

The processor 123 may calculate the danger prediction result including a first index indicating a probability of a traffic jam (sudden traffic jam) ahead of the vehicle 110, a second index indicating a probability of sudden braking of the preceding vehicle, and a third index indicating a probability of dangerous driving of the following vehicle, based on the danger prediction model. According to an embodiment, the traffic jam may include a state in which the driving speed of the vehicle is less than or equal to a reference value (e.g., 10 km/h), which causes the brake pressure of the following vehicle. According to an embodiment, the sudden braking may refer to a state in which the brake is pressed and the speed of the vehicle rapidly decelerates below a reference value and then stops.

According to an embodiment, the processor 123 may determine the degree of danger of the following vehicle based on the third index indicating the probability of the dangerous driving of the following vehicle occurs. For example, the processor 123 may determine the degree of danger by dividing the degree of danger into "safety", "normal", and "danger" depending on the probability of the dangerous driving.

According to an embodiment, the processor 123 may notify "safety" when the probability of dangerous driving is in a first range from '0' or more and less than the first threshold value, "normal" when the probability of dangerous driving is in a second range from the first threshold value or more and less than the second threshold value, and "danger" when the probability of the danger driving is in a range from the second threshold or more and a third threshold value or less. According to an embodiment, the processor 123 may set the first threshold value to a value exceeding '0', may set the second threshold value to a value exceeding the first threshold value, and may set the third threshold value to a value exceeding the second threshold value.

The processor 123 may receive the information about the driving of the vehicle 110, the third information about the surrounding vehicle, and the road information, when the danger prediction result is calculated based on the danger prediction model.

According to an embodiment, the processor 123 may receive the information about the driving which is acquired as the vehicle 110 is driving, from the vehicle 110. According to an embodiment, the processor 123 may receive the driving information including the information about a lane on which the vehicle 110 is driving, and the speed of the vehicle.

According to an embodiment, the processor 123 may receive, from the vehicle 110, the third information including a speed of the surrounding vehicle driving on a lane different from the lane on which the vehicle 110 is driving, and a distance from the vehicle 110 to the surrounding vehicle.

According to an embodiment, the processor 123 may receive, from the vehicle 110, the path to the destination, and may acquire information about a road included in the path to the destination. According to an embodiment, the processor 123 may acquire road information including a traffic flow of the lane on which the vehicle 110 is driving, information about presence of a shoulder road, and information about presence of a variable road. In this case, the traffic flow may include a continuous flow having no external influence controlling the traffic flow or an intermittent flow having a traffic jam by cutting off the continuous flow of traffic due to an intersection.

The processor 123 may determine an operation for coping with the danger based on the danger prediction result, the information about driving of the vehicle 110, first information about the preceding vehicle, the second information about the following vehicle, and the third information about the surrounding vehicle, and the road information. According to an embodiment, the operation for coping with the danger may include an operation for preventing the crash with the following vehicle when a traffic jam occurs ahead of the vehicle 110.

According to an embodiment, the processor 123 may determine whether a condition allowing lane change is satisfied, to avoid the crash with the following vehicle when the traffic jam occurs ahead of the vehicle 110. The processor 123 may determine whether a condition allowing lane change is satisfied, based on the information about driving of the vehicle 110, the first information about the preceding vehicle, the second information about the following vehicle, and the third information about the surrounding vehicle, and the road information. According to an embodiment, the processor 123 may determine the condition allowing lane change, based on the information about driving of the vehicle 110, the first information about the preceding vehicle, the second information about the following vehicle, and the third information about the surrounding vehicle, and the road information, according to a well-known technology related to lane change of an autonomous driving vehicle.

According to an embodiment, the processor 123 may determine the operation for coping with the danger, depending on whether the condition allowing lane change is satisfied. According to an embodiment, the processor 123 may determine the operation for coping with the danger, based on the degree of danger of the following vehicle to more safely avoid the crash with the following vehicle, when the traffic jam occurs ahead of the vehicle 110. The details of the operation for coping with the danger will be made with reference to FIGS. 4 to 6.

Figure 4:
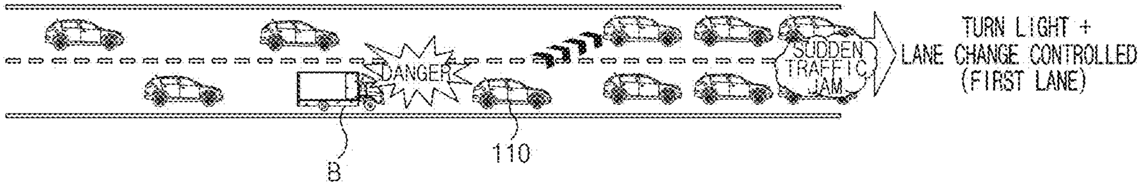
FIGS. 4, 5, and 6 are schematically illustrating the operation for coping with a danger, according to an embodiment of the present disclosure.
Figure 5:
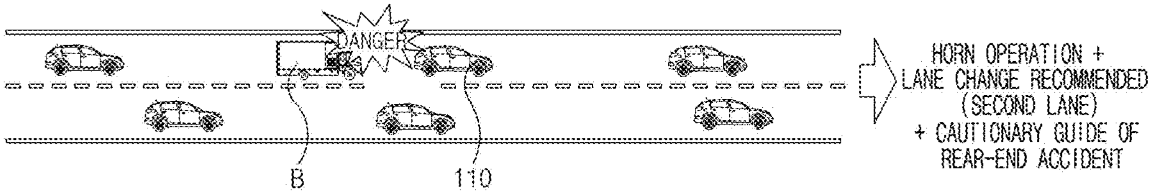
Figure 6:
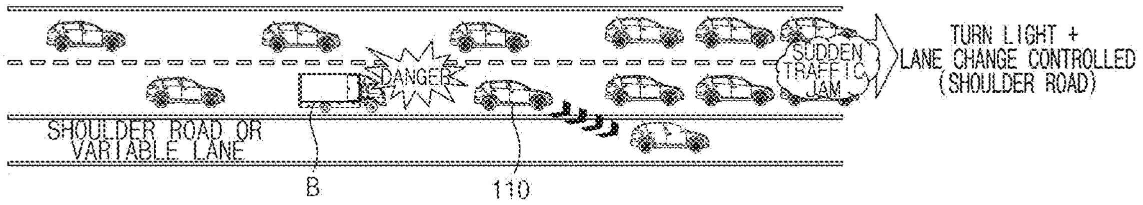

FIGS. 4 to 6 are schematically illustrating the operation for coping with the danger, according to an embodiment of the present disclosure.

As illustrated in FIG. 4, the processor 123 may determine whether the condition allowing lane change is satisfied, to prevent the crash with a following vehicle "B", when the traffic jam is determined as occurring ahead of the vehicle 110, based on the traffic information ahead of the vehicle 110, and when the degree of the danger of the following vehicle "B" is determined as "danger"

The processor 123 may determine an operation for turning on a turn light related to a direction for the lane change of the vehicle 110, for outputting information about the lane change through the output device 115, and for performing the lane change, as the operation for coping with the danger, when the condition allowing lane change is determined as being satisfied. According to an embodiment, the processor 123 may determine an operation for controlling the speed and the lane change of the vehicle 110 to perform the lane change to a first lane, as the operation for coping with the danger, As illustrated in FIG. 5, the processor 123 may determine whether the condition allowing lane change is satisfied, to prevent the crash with a following vehicle "B", when the distance between the following vehicle "B" and the vehicle 110 is less than a specific distance, and when the degree of the danger of the following vehicle "B" is determined as "danger".

According to an embodiment, the processor 123 perform a control operation that the vehicle 110 allows an emergency light to flicker, allows a message for informing that the horn sound is generated, to be output through the output device 115, and may determine an operation for generating the horn sound as the operation for coping with the danger, when the vehicle is determined not as satisfying the condition allowing the lane change.

According to an embodiment, the processor 123 may determine an operation for outputting information about the recommended lane for the lane change and a message for guiding the lane change to the recommended lane through the output device 115, when the condition allowing lane change is determined as not being satisfied. According to an embodiment, the processor 123 may determine an operation for outputting, through the output device 115, a message for guiding a second lane as the recommended lane for the lane change such that the vehicle 110 avoids the following vehicle "B".

As illustrated in FIG. 6, the processor 123 may determine whether the condition allowing lane change is satisfied, to prevent the crash with the following vehicle "B", when the traffic jam is determined as occurring ahead of the vehicle 110, based on the traffic information ahead of the vehicle 110, and when the degree of the danger of the following vehicle "B" is determined as "danger".

According to an embodiment, the processor 123 may determine whether a lane to be changed is present in addition to a lane allowing driving, based on the road information, when the condition allowing lane change is determined not as being satisfied, In this case, the lane to be changed in addition to a lane allowing driving may include a shoulder road or a variable road.

The processor 123 may determine an operation for turning on a turn light related to a direction for the lane change of the vehicle 110, for outputting information about the lane change through the output device 115, and for performing the lane change, as the operation for coping with the danger, when the lane to be changed is determined as being present in addition to the lane allowing driving, even if the lane change condition is not satisfied. According to an embodiment, the processor 123 may determine an operation for controlling a vehicle speed and a lane change to perform the lane change to the shoulder road or the variable road.

When the operation for coping with the danger is determined, the processor 123 may transmit information about the operation for coping with the danger to the vehicle 110, such that the vehicle 110 controls driving based on the operation for coping with the danger.

Figure 7:
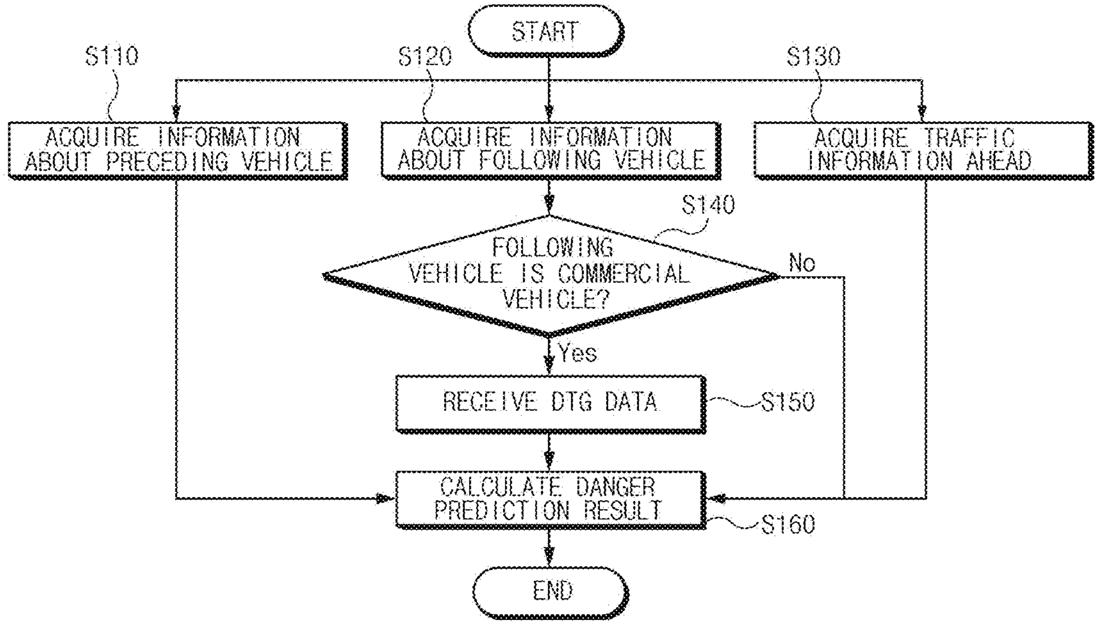
FIGS. 7 and 8 are flowcharts illustrating a method for controlling a vehicle, according to an embodiment of the present disclosure.
Figure 8:
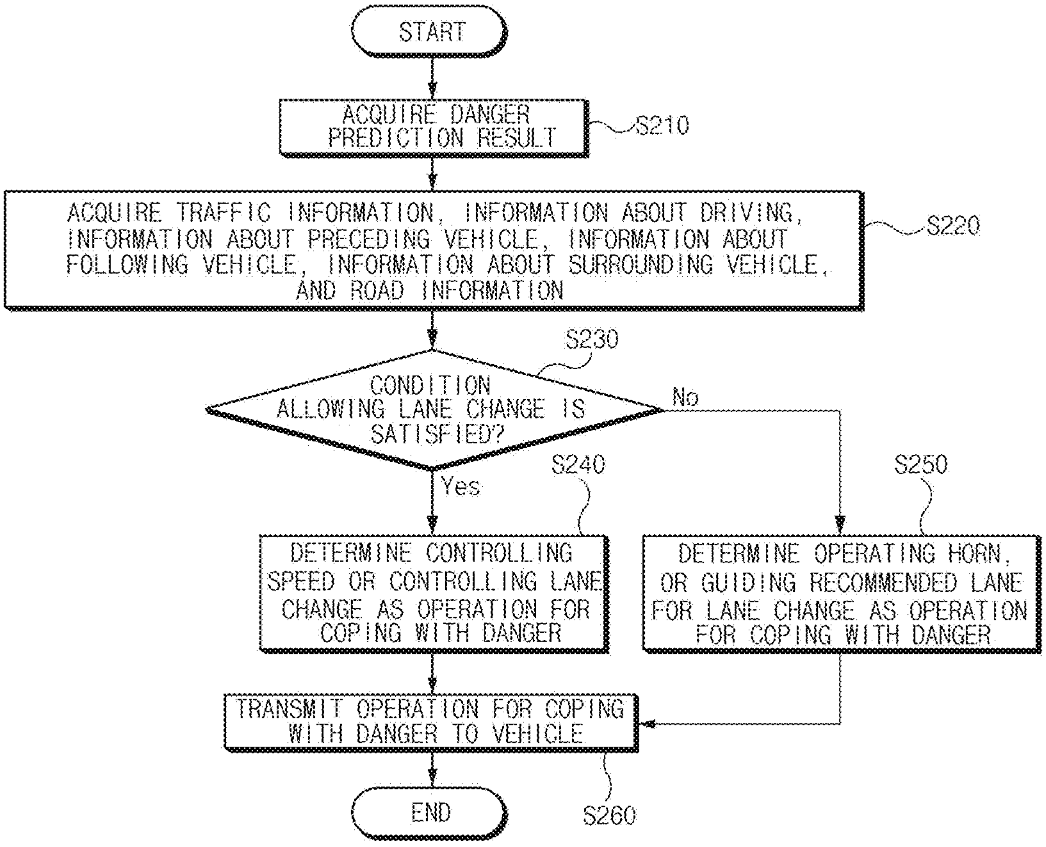

FIGS. 7 to 8 are views illustrating a method for controlling a vehicle, according to an embodiment of the present disclosure.

As illustrated in FIG. 7, the server 120 may acquire the first information of the preceding vehicle from the vehicle 110 (S110).

According to an embodiment, the server 120 may receive the first information including the speed of a preceding vehicle driving ahead of the vehicle 110 on a lane the same as a lane on which the vehicle 110 is driving, the position of the preceding vehicle, and the distance from the vehicle 110 to the preceding vehicle.

The server 120 may acquire the second information of the following vehicle from the vehicle 110 (S120).

According to an embodiment, the server 120 may receive the second information including the speed of a following vehicle driving behind the vehicle 110 on a lane the same as a lane on which the vehicle 110 is driving, the position of the following vehicle, and the distance from the vehicle 110 to the following vehicle.

According to an embodiment, the server 120 may acquire traffic information ahead of the vehicle 110 (S130).

According to an embodiment, the server 120 may receive information about a path to a destination from the vehicle 110. The server 13 may receive traffic information included in the path to the destination from the vehicle 110, or from a traffic server to provide the traffic information.

According to an embodiment, the server 120 may determine the type of the following vehicle based on the second information. According to an embodiment, the server 120 may determine whether the following vehicle is a commercial vehicle (S140).

In this case, the commercial vehicle is a commercial vehicle for commercial use, and may include a van including a bus for carrying a person, and a freight vehicle including a truck for loading goods.

In S140, the server 120 may receive data, which is measured through digital tacho graph (DTG) of the following vehicle, from a server (e.g., Korea Transportation Safety Authority) providing a driving record, when the following vehicle is the commercial vehicle (S150).

In this case, the DTG may store a vehicle driving record in real time while serving as a driving record device and transmit the vehicle driving record to a server that provides the driving record. For example, the data measured through the DTG may include a vehicle speed, an RPM, a brake signal, a vehicle position through GPS, an azimuth angle, an acceleration, a driving distance, a continuous driving time, a break time, and traffic accident information.

In S150, the server 120 may receive the data measured through the DTG of the following vehicle and determine the driving tendency of the driver driving the following vehicle. According to an embodiment, the server 120 may determine a driving tendency including sudden braking and drowsy driving resulting driving without securing the safe following distance by the following vehicle.

The server 120 may calculate the danger prediction result by inputting the traffic information ahead of the vehicle 110, the first information, and the second information into the danger prediction model (S160).

According to an embodiment, the danger prediction model may be trained to output the danger prediction result based on learning data using an artificial neural network (ANN). According to an embodiment, the learning data may include the traffic information, the first information, and the second information which are previously acquired, to generate the danger prediction model.

According to an embodiment, the server 120 may input the driving tendency of the driver, which is determined based on the data measured through the DTG into the danger prediction model, together with the traffic information ahead of the vehicle 110, the first information, and the second information, when the following vehicle is determined as being the commercial vehicle. Accordingly, the server 120 may calculate the danger prediction result based on the driving tendency of the driver driving the following vehicle, when determining the following vehicle as the commercial vehicle.

The server 120 may calculate the danger prediction result including a first index indicating a probability of a traffic jam (sudden traffic jam) ahead of the vehicle 110, a second index indicating a probability of sudden braking of the preceding vehicle, and a third index indicating a probability of dangerous driving of the following vehicle, based on the danger prediction model. According to an embodiment, the server 120 may determine the degree of danger of the following vehicle based on the third index indicating the probability of the dangerous driving of the following vehicle. For example, the server 120 may determine the degree of danger by dividing the degree of danger into "safety", "normal", and "danger" depending on the probability of the dangerous driving.

According to an embodiment, the server 120 may notify "safety" when the probability of dangerous driving is in the first range from '0' or more and less than the first threshold value, "normal" when the probability of dangerous driving is in a second range from the first threshold value or more and less than the second threshold value, and "danger" when the probability of the danger driving is in a range from the second threshold or more and a third threshold value or less. According to an embodiment, the server 120 may set the first threshold to a value exceeding '0', may set the second threshold to a value exceeding the first threshold, and may set the third threshold to a value exceeding the second threshold.

As illustrated in FIG. 8, the server 120 may acquire the danger prediction result calculated based on the danger prediction model (S210).

The server 120 may acquire traffic information ahead of the vehicle 110, the information about the driving of the vehicle 110, the first information of the preceding vehicle, the second information of the following vehicle, the third information of the surrounding vehicle, and the road information, when the danger prediction result is acquired based on the danger prediction model.

According to an embodiment, the server 120 may receive the information about the driving which is acquired as the vehicle 110 is driving, from the vehicle 110. According to an embodiment, the vehicle 110 may receive the information about the lane on which the vehicle 110 is driving, and the driving information including the speed of the vehicle 110.

According to an embodiment, the server 120 may receive, from the vehicle 110, the third information including a speed of the surrounding vehicle driving on a lane different from the lane on which the vehicle 110 is driving, and a distance from the vehicle 110 to the surrounding vehicle.

According to an embodiment, the server 120 may receive the path to the destination, from the vehicle 110 and may acquire information about a road included in the path to the destination. According to an embodiment, the server 120 may acquire road information including a traffic flow of the lane on which the vehicle 110 is driving, information about presence of a shoulder road, and information about presence of a variable road. In this case, the traffic flow may include a continuous flow having no external influence controlling the traffic flow or an intermittent flow having a traffic jam by cutting off the continuous flow of traffic due to an intersection.

The server 120 may determine an operation for coping with the danger based on the danger prediction result, the information about driving of the vehicle 110, the first information about the preceding vehicle, the second information about the following vehicle, and the third information about the surrounding vehicle, and the road information. According to an embodiment, the operation for coping with the danger may include an operation for preventing the crash with the following vehicle when a traffic jam occurs ahead of the vehicle 110.

According to an embodiment, the server 120 may determine whether the condition allowing lane change is satisfied, to avoid the crash with the following vehicle, when the traffic jam occurs ahead of the vehicle 110 (S230).

According to an embodiment, the server 120 may determine whether the condition allowing lane change is satisfied, based on the information about driving of the vehicle 110, the first information about the preceding vehicle, the second information about the following vehicle, and the third information about the surrounding vehicle, and the road information. According to an embodiment, the server 120 may determine the condition allowing lane change, based on the information about driving of the vehicle 110, the first information about the preceding vehicle, the second information about the following vehicle, and the third information about the surrounding vehicle, and the road information, according to a well-known technology related to lane change of an autonomous driving vehicle. The server 120 may determine the operation for coping with the danger, based on the degree of danger of the following vehicle to more safely avoid the crash with the following vehicle, when the traffic jam occurs ahead of the vehicle 110.

According to an embodiment, the server 120 may determine whether the condition allowing lane change is satisfied, to prevent the crash with a following vehicle, when the traffic jam is determined as occurring ahead of the vehicle 110, based on the traffic information ahead of the vehicle 110, and when the degree of the danger of the following vehicle is determined as "danger"

According to an embodiment, the server 120 may determine an operation for turning on a turn light related to a direction for the lane change of the vehicle 110, for outputting information about the lane change through the output device 115, for controlling the speed of the vehicle 110, and for performing the lane change, as the operation for coping with the danger, when the condition allowing lane change is determined as being satisfied (S240).

According to an embodiment, the server 120 may determine whether the condition allowing lane change is satisfied, to prevent the crash with the following vehicle, when the distance between the following vehicle and the vehicle 110 is less than a specific distance, and when the degree of the danger of the following vehicle is determined as "danger"

According to an embodiment, the server 120 perform a control operation that the vehicle 110 allows an emergency light to flicker, allows a message for informing that the horn sound is generated, to be output through the output device 115, and may determine an operation for generating the horn sound as the operation for coping with the danger, when the vehicle is determined not as satisfying the condition allowing the lane change (S250).

According to an embodiment, the server 120 may determine the operation for outputting information about a lane recommended for the lane change of the vehicle 110 and a message for guiding the lane change to the recommended lane, through the output device 115, as the operation for coping with the danger, when the vehicle is determined not as satisfying the condition allowing the lane change.

According to an embodiment, the server 120 may determine whether the condition allowing lane change is satisfied, to prevent the crash with the following vehicle, when the traffic jam is determined as occurring ahead of the vehicle 110, based on the traffic information ahead of the vehicle 110, and when the degree of the danger of the following vehicle is determined as "danger".

According to an embodiment, the server 120 may determine whether a lane to be changed is present in addition to a lane allowing driving, based on the road information, when the condition allowing lane change is determined not as being satisfied, In this case, the lane to be changed in addition to a lane allowing driving may include a shoulder road or a variable road.

The server 120 may determine an operation for turning on a turn light related to a direction for the lane change of the vehicle 110, for outputting information about the lane change through the output device 115, and for performing the lane change, as the operation for coping with the danger, when the lane to be changed is determined as being present in addition to the lane allowing driving, even if the lane change condition is not satisfied. According to an embodiment, the server 120 may determine, as the operation for coping with the danger, an operation for controlling a vehicle speed and a lane change to perform the lane change to the shoulder road or the variable road.

The server 120 may transmit the information about the operation for coping with the danger to the vehicle 110, when the operation for coping with the danger is determined (S260). Accordingly, the server 120 may allow the vehicle 110 to control the driving based on the operation for coping with the danger FIG. 9 is a flowchart illustrating the operation of a vehicle, according to an embodiment of the present disclosure.

Figure 9:
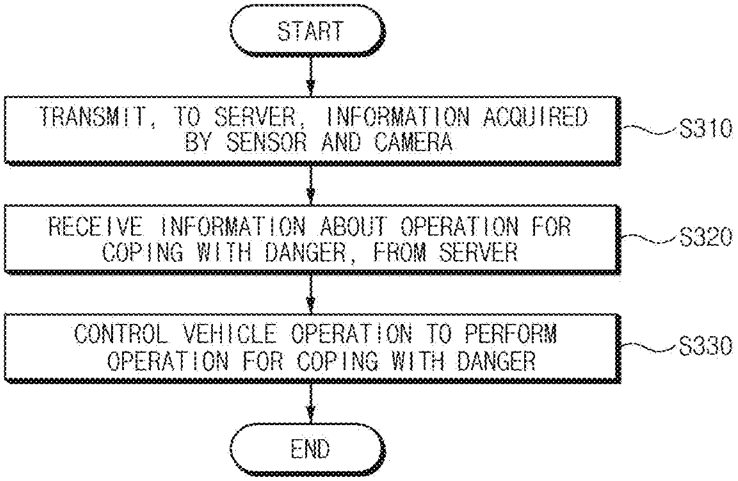
FIG. 9 is a flowchart illustrating the operation of a vehicle, according to an embodiment of the present disclosure.

As illustrated in FIG. 9, the vehicle 110 may transmit, to the server 120, the information acquired by the sensor 112 and the camera 113 (S310).

The vehicle 110 may receive the information about the operation for coping with the danger, from the server 120 (S320).

The vehicle 110 may control to perform the operation corresponding to the operation for coping with the danger, which is received from the server 120 (S330).

According to an embodiment, the processor 117 may control to turn on a turn light to correspond to the operation for coping with the danger which is received from the server 120, to output information about lane change through the output device 115, to control a vehicle speed, and to perform the lane change.

According to an embodiment, the processor 117 may control an emergency light to flicker corresponding to the operation for coping with the danger, which is received from the server 120, to output a message for informing that a horn sound is generated, through the output device 115, and generate the horn sound.

According to an embodiment, the processor 117 may control to output information about a lane recommended for the lane change and a message for guiding the lane change to the recommended lane through the output device 115, to correspond to the operation for coping with the danger, which is received from the server 120.

Figure 10:
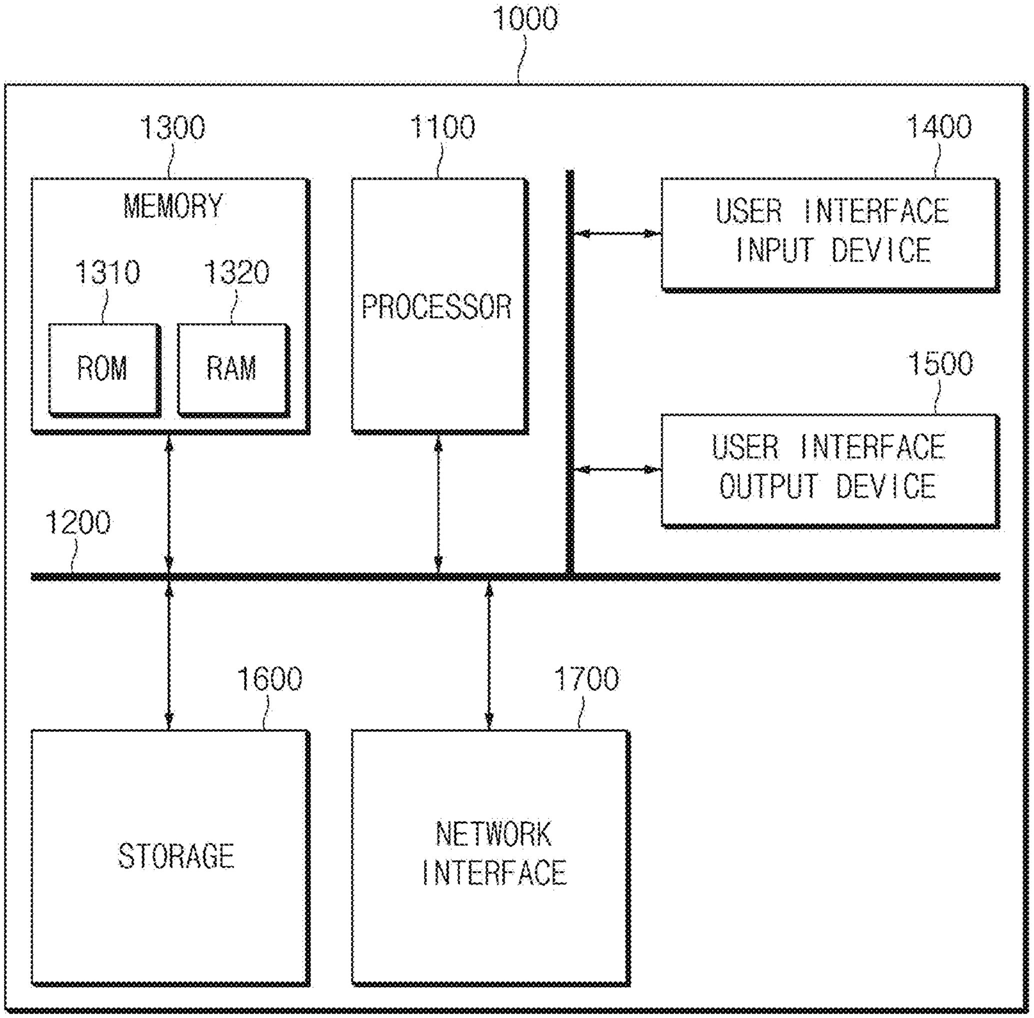
FIG. 10 is a view illustrating the configuration of a computing system to execute a method according to an embodiment of the present disclosure.

FIG. 10 is a view illustrating the configuration of a computing system to execute a method according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the system and the method for providing the vehicle, the crash danger of a following vehicle may be avoided based on information about a preceding vehicle, information about the following vehicle, and information about a front traffic environment on a lane on which a host vehicle is driving, and information about a preceding vehicle on a surrounding lane, and information about a following vehicle on the surrounding lane.

According to an embodiment of the present disclosure, the safety may be ensured by predicting the drowsy driving of the following vehicle or driving of the following vehicle without safe following distance ensured to avoid the crash danger.

The above description is merely an example of the technical idea of the present disclosure, and various modifications and modifications may be made by one skilled in the art without departing from the essential characteristic of the present disclosure.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A system for controlling a vehicle, the system comprising:

a vehicle configured to acquire information about driving, first information about a preceding vehicle, second information about a following vehicle, and third information about a surrounding vehicle; and a server configured to:

acquire traffic information ahead of the vehicle;

calculate a danger prediction result by inputting the traffic information, the first information, and the second information into a danger prediction model;

determine an operation for coping with a danger based on at least one of the traffic information, the danger prediction result, the information about the driving, the first information, the second information, the third information, road information, or any combination thereof; and transmit information about the operation for coping with the danger to the vehicle;

wherein the server is configured to determine an operation for outputting information about a lane recommended for a lane change and a message for guiding the lane change to the recommended lane, as the operation for coping with the danger, when the vehicle does not satisfy a condition allowing the lane change.

2. The system of claim 1, wherein the vehicle is configured to acquire information about a lane on which the vehicle is driving, and the information about the driving, which includes a speed of the vehicle, and is configured to transmit the acquired information about the lane to the server.

3. The system of claim 1, wherein the vehicle is configured to acquire the first information including a speed of the preceding vehicle, which drives ahead of the vehicle, on a lane the same as the lane on which the vehicle is driving, and a distance from the vehicle to the preceding vehicle.

4. The system of claim 1, wherein the vehicle is configured to acquire the second information including a speed of the preceding vehicle, which drives behind the vehicle, on a lane the same as the lane on which the vehicle is driving, and a distance from the vehicle to the following vehicle, a type of the following vehicle.

5. The system of claim 1, wherein the vehicle is configured to acquire the third information including a speed of the surrounding vehicle driving on a lane different from a lane on which the vehicle is driving, and a distance from the vehicle to the surrounding vehicle.

6. The system of claim 1, wherein the server is configured to determine whether the following vehicle is a commercial vehicle, based on the second information, and is configured to acquire a Digital tacho graph (DTG) data of the following vehicle, when the following vehicle is the commercial vehicle.

7. The system of claim 6, wherein the server is configured to determine a driving tendency of a driver, based on the DTG data of the following vehicle.

8. The system of claim 7, wherein the server is configured to calculate the danger prediction result by inputting the driving tendency of the driver into the danger prediction model, when the following vehicle is the commercial vehicle.

9. The system of claim 1, wherein the server is configured to calculate the danger prediction result including a first index indicating a probability of traffic jam ahead of the vehicle, a second index indicating a probability of sudden braking of the preceding vehicle, and a third index indicating a probability of dangerous driving of the following vehicle, based on the danger prediction model.

10. The system of claim 1, wherein the server is configured to acquire a traffic flow of a lane on which the vehicle is driving, information about presence of a shoulder road, and information about presence of a variable road.

11. The system of claim 1, wherein the server is configured to determine whether the condition allowing the lane change is satisfied, and to determine the operation for coping with the danger, based on a determination result.

12. The system of claim 11, wherein the server is configured to determine an operation for turning on a turn light to perform the lane change as the operation for coping with the danger, when the vehicle is determined as satisfying the condition for allowing the lane change.

13. The system of claim 11, wherein the server is configured to determine an operation for allowing an emergency light to flicker and generating a horn sound as the operation for coping with the danger, when the vehicle is determined to not satisfy the condition allowing the lane change.

14. The system of claim 1, wherein the vehicle is configured to receive the operation for coping with the danger from the server, and to perform the operation for coping with the danger.

15. A method for controlling a vehicle, the method comprising:

acquiring information about driving of a vehicle, first information about a preceding vehicle, second information about a following vehicle, and third information about a surrounding vehicle, and transmitting the information, the first information, the second information, and the third information to a server;

acquiring, by the server, traffic information ahead of the vehicle, and calculating a danger prediction result by inputting the traffic information, the first information, and the second information into a danger prediction model;

determining, by the server, an operation for coping with a danger based on at least one of the traffic information, the danger prediction result, the information about the driving, the first information, the second information, the third information, road information, or a combination of the first information, the second information, the third information, and the road information;

transmitting, by the server, information about the operation for coping with the danger to the vehicle; and determining, by the server, an operation for outputting information about a lane recommended for a lane change and a message for guiding the lane change to the recommended lane, as the operation for coping with the danger, when the vehicle does not satisfy a condition allowing the lane change.

16. The method of claim 15, further comprising:

calculating, by the server, the danger prediction result including a first index indicating a probability of traffic jam ahead of the vehicle, a second index indicating a probability of sudden braking of the preceding vehicle, and a third index indicating a probability of dangerous driving of the following vehicle, based on the danger prediction model.

17. The method of claim 15, further comprising:

determining, by the server, whether the condition allowing the lane change is satisfied and determining the operation for coping with the danger, based on a determination result.

18. The method of claim 17, further comprising:

determining, by the server, an operation for turning on a turn light to perform the lane change as the operation for coping with the danger, when the vehicle is determined to satisfy the condition for allowing the lane change.

19. The method of claim 15, further comprising:

receiving, by the vehicle, the operation for coping with the danger from the server, and to perform the operation for coping with the danger.

* * * * *